US012377831B2

(12) United States Patent
Gunselmann et al.

(10) Patent No.: US 12,377,831 B2
(45) Date of Patent: Aug. 5, 2025

(54) METHOD FOR OPERATING A VEHICLE BRAKE SYSTEM, AND BRAKE SYSTEM

(71) Applicant: Continental Automotive Technologies GmbH, Hannover (DE)

(72) Inventors: Christian Gunselmann, Eschborn (DE); Alexander Rodatos, Hünfelden (DE); Nils Horstmann, Schwabenheim (DE); Farid Abedini Bayghra, Darmstadt (DE); Roman Katchan, Frankfurt am Main (DE); Lukas Jung, Riedstadt (DE); Scott R Smith, Waterford, MI (US)

(73) Assignee: Continental Automotive Technologies GmbH, Hannover (DE)

( * ) Notice: Subject to any disclaimer, the term of this patent is extended or adjusted under 35 U.S.C. 154(b) by 394 days.

(21) Appl. No.: 17/594,446

(22) PCT Filed: Apr. 3, 2020

(86) PCT No.: PCT/EP2020/059476
§ 371 (c)(1),
(2) Date: Oct. 15, 2021

(87) PCT Pub. No.: WO2020/212162
PCT Pub. Date: Oct. 22, 2020

(65) Prior Publication Data
US 2022/0212645 A1 Jul. 7, 2022

Related U.S. Application Data

(60) Provisional application No. 62/835,865, filed on Apr. 18, 2019.

(30) Foreign Application Priority Data
Apr. 23, 2019 (DE) ..................... 10 2019 205 785.3

(51) Int. Cl.
*B60T 13/58* (2006.01)
*B60L 7/24* (2006.01)
*B60T 17/22* (2006.01)

(52) U.S. Cl.
CPC .............. *B60T 13/586* (2013.01); *B60L 7/24* (2013.01); *B60T 17/221* (2013.01);
(Continued)

(58) Field of Classification Search
CPC ................. B60T 13/586; B60T 17/221; B60T 2201/124; B60T 2210/20; B60T 2210/30;
(Continued)

(56) References Cited

U.S. PATENT DOCUMENTS 6,275,763 B1 8/2001 Lotito
2006/0273658 A1 12/2006 Halassy-Wimmer et al.
(Continued)

FOREIGN PATENT DOCUMENTS

CN 103140395 A 6/2013
CN 105922981 A 9/2016
(Continued)

OTHER PUBLICATIONS

Machine Translation: GB-2498794-A (Year: 2013).*
(Continued)

*Primary Examiner* — Anne Marie Antonucci
*Assistant Examiner* — Connor L Knight

(57) ABSTRACT

A method for operating a vehicle brake system, wherein the brake system has at least one friction brake and at least one regenerative brake. A defined switching pattern is specified for switching between a self-cleaning operating mode for cleaning the friction brake and a normal operating mode of the brake system. The method includes determining information describing the state of the at least one friction brake, determining the state of the at least one friction brake from (Continued)

the information, determining whether the state satisfies a specific switching criterion, and, if the self-cleaning operating mode is to be activated according to the switching pattern and the state of the friction brake does not satisfy the switching criterion, suppressing activation of the self-cleaning operating mode and maintaining the normal operating mode.

20 Claims, 2 Drawing Sheets

(52) U.S. Cl.
CPC ..... *B60T 2201/124* (2013.01); *B60T 2210/20* (2013.01); *B60T 2210/30* (2013.01); *B60T 2250/00* (2013.01); *B60T 2250/04* (2013.01); *B60T 2270/604* (2013.01)

(58) Field of Classification Search
CPC ............ B60T 2250/00; B60T 2250/04; B60T 2270/604; B60T 1/10; B60T 2270/406; B60T 8/172; B60L 7/24; F16D 61/00
See application file for complete search history.

(56) References Cited

U.S. PATENT DOCUMENTS

| | | | |
|---|---|---|---|
| 2013/0023382 A1* | 1/2013 | Ljungdahl | F16D 65/0037 477/185 |
| 2013/0204502 A1 | 8/2013 | Biller et al. | |
| 2014/0229045 A1 | 8/2014 | Borchers | |
| 2017/0259671 A1* | 9/2017 | Kim | B60T 7/042 |
| 2018/0229698 A1* | 8/2018 | Salmon | B60T 7/12 |
| 2018/0257491 A1 | 9/2018 | Tomita et al. | |
| 2020/0156614 A1* | 5/2020 | Choi | F16D 65/0037 |
| 2020/0398799 A1* | 12/2020 | Waenninger | B60T 13/662 |
| 2021/0094546 A1* | 4/2021 | Bonaccorso | B60W 20/15 |

FOREIGN PATENT DOCUMENTS

| | | | | |
|---|---|---|---|---|
| DE | 19947903 A1 | 8/2000 | | |
| DE | 102011103660 A1 | 12/2012 | | |
| DE | 102011121109 A1 | 6/2013 | | |
| DE | 102016007436 A1 | 12/2017 | | |
| DE | 102016221939 A1 * | 5/2018 | | |
| DE | 102016222504 A1 | 5/2018 | | |
| DE | 102017205810 A1 * | 10/2018 | | |
| DE | 102017117945 A1 | 2/2019 | | |
| EP | 3061660 A1 * | 8/2016 | ............... | B60T 7/18 |
| GB | 2498794 A * | 7/2013 | ............... | B60T 1/10 |
| JP | H1191539 A | 4/1999 | | |
| JP | 2007512992 A | 5/2007 | | |
| WO | 2017047071 A1 | 3/2017 | | |

OTHER PUBLICATIONS

Machine Translation: DE-102017205810-A1 (Year: 2018).*
Machine Translation: DE-102016221939-A1 (Year: 2018).*
Chinese First Office Action dated Apr. 29, 2023 for the counterpart Chinese Patent Application No. 202080028971.0 and DeepL Translation of same.
International Search Report and the Written Opinion of the International Searching Authority mailed on Jul. 6, 2020 for the counterpart PCT Application No. PCT/EP2020/059476.

* cited by examiner

METHOD FOR OPERATING A VEHICLE BRAKE SYSTEM, AND BRAKE SYSTEM

CROSS-REFERENCE TO RELATED APPLICATIONS

The present application is a National Stage Application under 35 U.S.C. 371 of International Application No. PCT/EP2020/059476 filed on Apr. 3, 2020, which claims priority from German Patent Application No. 10 2019 205 785.3 filed on Apr. 23, 2019, in the German Patent and Trade Mark Office, and which claims the benefit of U.S. Provisional Patent Application No. 62/835,865 filed on Apr. 18, 2019, in the U.S. Patent and Trademark Office, the disclosures of which are herein incorporated by reference in their entireties.

BACKGROUND

1. Field

The present application relates to a method for operating a vehicle brake system and to a brake system for a motor vehicle.

2. Description of Related Art

Motor vehicles which are equipped with an electric drive that can also be operated as a regenerative brake and with a friction brake system comprising friction brakes can execute a demanded vehicle deceleration (braking operation) by two different methods.

First, by operation of the electric drive as a generator (regenerative brake), the kinetic energy of the vehicle is converted at least partially into electrical energy. The electrical energy is preferably stored in an energy storage device (e.g. a battery) and/or converted into thermal energy. By actuation of the friction brake system (friction brake, e.g. disk or drum brakes), on the other hand, the kinetic energy is converted into thermal energy on account of friction between corresponding friction partners.

In this context, regenerative braking is normally used for preference since, in this case, it is possible both to lower the fuel consumption of the vehicle and to reduce wear on the friction brake system.

If, in principle, the regenerative brake were used in preference to the friction brakes, this would have the result that the effectiveness of the friction brake system would deteriorate, owing to corrosion for example. Among the undesirable effects would be noticeable acoustic phenomena (e.g. squealing of the brake).

Second, another consequence of favoring the regenerative brake over the friction brake may furthermore be a reduced braking effect, especially in the time immediately after actuation. This is perceptible to the driver from fluctuations in deceleration, e.g. if the brake system has to switch deceleration from regenerative braking to the use of the friction brake during a braking operation (blending) (e.g. if the deceleration effect of the electric drive is no longer sufficient at low speeds).

For this reason, there is a known practice of providing for activation of the friction brake to decelerate the vehicle in accordance with a predetermined regular activation pattern. This ensures that the desired state is reestablished by self-cleaning the friction brake by the actuation itself, even before any noticeable deterioration (e.g. due to corrosion of brake pads and/or of the brake disk in the case of a disk brake).

Here, the specified activation pattern for the activation of the friction brake is preferably defined in such a way that deterioration of the friction braking effect is prevented in all cases. In this context, strict boundary conditions are often assumed for the definition of the activation pattern, leading to severe or rapid deterioration of the braking effect. However, many journeys will take place under more favorable boundary conditions. The result will be that, on many journeys, braking will be carried out by means of the friction brake more frequently than would be advisable for low fuel consumption and/or low wear on the friction brake system and than would be required to avoid any deterioration in the braking effect.

SUMMARY

It is then the underlying object of the present application to provide an improved method for operating a vehicle brake system having at least one regenerative brake and at least one friction brake and to provide an improved brake system for a vehicle having at least one regenerative brake and at least one friction brake.

This object is achieved with the method as claimed in claim 1 and the brake system as claimed in claim 16. Preferred refinements of the present application are specified in the dependent claims.

In a first aspect, the present application relates to a method for operating a vehicle brake system, wherein the brake system has at least one friction brake and at least one regenerative brake. In this case, a defined switching pattern is specified for switching between a self-cleaning operating mode for cleaning the friction brake and a normal operating mode of the brake system. The method comprises determining information describing the state of the at least one friction brake, determining the state of the at least one friction brake from the information, determining whether the state satisfies a specific switching criterion, and, if the self-cleaning operating mode is to be activated according to the switching pattern and the state of the friction brake does not satisfy the switching criterion, suppressing activation of the self-cleaning operating mode and maintaining the normal operating mode.

Provision is preferably made here for the brake system to switch back to the normal operating mode after cleaning of the friction brake has taken place in the self-cleaning operating mode. In this context, the performance of the method may be triggered as a result of a braking request received from the vehicle driver or a driving function, for example.

In this case, a "regenerative brake" is understood to mean any type of deceleration device in which appropriate control of an electric drive motor of the vehicle and/or of the peripherals thereof is used to make the electric drive motor exert a deceleration torque on one wheel or several wheels of the vehicle and, at the same time, at least some of the kinetic energy thus obtained is converted into electrical energy for charging an energy source of the vehicle or into thermal energy. In this context, a regenerative brake may have either a single electric drive motor connected to one or more wheels of the vehicle or a multiplicity of electric drive motors, each connected to at least one wheel of the vehicle. More particularly, a regenerative brake may also be designed in such a way that a wheel-specific electric drive is arranged on each wheel.

In this context, a "switching pattern" should be understood to mean a specification which defines minimum requirements for the actuation of the friction brake in order to prevent degradation of the friction brake in respect of the available deceleration effect. Here, the preferably regular switching pattern is chosen in such a way, for example, that, under normal conditions, the self-cleaning operating mode of the friction brake is activated whenever it can be assumed, on a purely statistical basis, that cleaning of the friction brake is necessary, e.g. on account of corrosion or some other contamination.

The self-cleaning operating mode is preferably used to specify the parameters with which the friction brake is to be activated, ensuring as powerful as possible a cleaning effect of the friction brake when the vehicle is decelerated. Such a parameter may, for example, be a minimum pressure to be set for a defined period, making it possible, in the case of a deceleration with such parameters, to assume that the friction brake has been cleaned after the deceleration. For this purpose, an energy input into the friction brake during the deceleration may furthermore also be used. If the specified parameters are not achieved during the deceleration of the vehicle as a result of a braking demand, provision can be made, in the case of subsequent braking demands, to continue using the friction brake in accordance with the self-cleaning operating mode for vehicle deceleration until the required parameters are satisfied, that is to say the friction brake may be regarded as cleaned. Only then does the brake system switch back into the normal operating mode, in which the deceleration torque is distributed in such a way between the friction brakes and the regenerative brakes that as energy-efficient operation as possible is achieved.

Accordingly, the method according to the present application envisages that, through selective monitoring of the state of the friction brake by means of corresponding state information, it is possible to check whether activation of a self-cleaning operating mode provided according to the switching pattern is in fact necessary for the friction brake. Depending on the determined state of the brake, either the activation of the self-cleaning operating mode of the friction brake, as provided according to the switching pattern, is carried out or activation of the self-cleaning operating mode is suppressed. This has the advantage that use of the friction brake in the context of the self-cleaning operating mode and therefore corresponding wear on the friction partners and loss of thermal energy, which, although envisaged on the basis of the switching pattern is not necessary per se on the basis of the state of the friction brake, can be avoided. In this way, the efficiency of the recovery of braking energy can be enhanced and wear on the friction brake can be reduced. Here, suppression of the activation of the self-cleaning operating mode is preferably carried out by a control unit of the brake system.

In this case, the regenerative brake of the vehicle is preferably designed to transfer energy recovered during a deceleration of the vehicle to an energy source (traction battery) of the vehicle. Furthermore, the regenerative brake can also be designed to convert energy recovered during a deceleration of the vehicle into thermal energy. This may be necessary, for example, if it is not possible to feed any more energy to the energy source of the vehicle, making it necessary to dissipate the energy obtained during the deceleration of the vehicle in some other way.

The vehicle preferably has at least two but, in particular, four friction brakes. According to refinements of the present application, it is envisaged here that at least one of the wheels of the vehicle, in particular all the wheels on one axle, in particular all the wheels, can be decelerated both by means of a regenerative brake and by means of a friction brake. However, provision may also be made for the wheels on a front axle of the vehicle or wheels on a rear axle of the vehicle to be respectively decelerated exclusively by a friction brake.

According to one embodiment, it is envisaged in this case that the self-cleaning operating mode specifies a fixed relationship between a deceleration torque applied by the friction brake and a deceleration torque applied by the regenerative brake for the purpose of decelerating the vehicle. Thus, for example, provision may be made in the self-cleaning operating mode for the total required deceleration torque for the implementation of a braking demand always to be applied in equal proportions or in some other predefined ratio by the friction brake and the regenerative brake. In this case, the predefined ratio is preferably independent of the determined state of the brake and is used equally in accordance with the switching pattern in every activation of the friction brake in the context of the self-cleaning operating mode.

However, it is also possible to envisage that only the friction brake is used to decelerate the vehicle in the self-cleaning operating mode. It is furthermore also possible to use the self-cleaning operating mode to define how long such a mode is to be maintained. Here, the duration may be specified purely in terms of time or, alternatively, by a necessary energy input into the friction brake.

According to another embodiment, it is furthermore envisaged that the switching pattern defines a time interval between successive activations of the self-cleaning operating mode. Thus, for example, it may be envisaged that, after an activation of the self-cleaning operating mode and corresponding cleaning of the friction brake have occurred, a subsequent activation of the self-cleaning operating mode should take place after 2 hours. Here, the corresponding time period preferably depends on the actual operating time of the vehicle.

According to another embodiment, it is furthermore envisaged that the switching pattern specifies a maximum number of braking operations between successive activations of the friction brake. This approach should be interpreted analogously to the above-described switching pattern involving defined time periods, but in this case merely with a number of braking operations instead of a time period. Thus, it is possible, for example, to provide for an activation of the self-cleaning operating mode for the friction brake to take place at the latest for every third braking operation.

In particular, it is also possible to make provision for the switching pattern to specify a combination of a maximum number of braking operations and a maximum time interval between successive activations of the self-cleaning operating mode. Depending on which criterion occurs first, a corresponding activation of the self-cleaning operating mode is provided. This is particularly advantageous since the number of braking operations and the time interval between the braking operations may vary very greatly, depending on the driving profile (freeway, urban traffic, country roads).

According to another embodiment, it is furthermore envisaged that the switching pattern depends on environmental conditions in the region of the vehicle. Thus, provision may be made, for example, for an activation of the self-cleaning operating mode for cleaning the friction brake to be provided more frequently if precipitation or salt spray has been detected in the surroundings of the vehicle, while activations are provided rather less often in dry and/or hot conditions. Moreover, information from a light or rain sensor of the vehicle may also be used.

The check to determine whether the self-cleaning operating mode is to be activated according to the switching pattern and whether the state of the friction brake satisfies the switching criterion is preferably carried out particularly when a braking demand has been initiated by the vehicle driver or a driving function of the vehicle, e.g. a braking assistant.

Here, the information describing the state of the friction brake can be determined continuously, in particular at fixed intervals, or can be triggered by certain events in the vehicle. Likewise, the state of the friction brake can be determined from the information either continuously or in a situation-dependent manner.

As already explained above, it is envisaged in the context of the method according to the present application that the state of the friction brake is determined from corresponding state information. In this case, the state of the friction brake is preferably determined continuously, preferably by a control unit of the brake system. In this context, the corrosion state of the brake pads and/or of the brake disk of the friction brake are/is evaluated, for example. For this purpose, relevant information, directly or indirectly describing the state of the friction brake, which has an effect on the deterioration of the effectiveness of the friction brake in respect of the deceleration effect thereof, is preferably evaluated.

Here, the state of the friction brake can be quantified by means of different variables and values. According to one embodiment, it is envisaged for this purpose that the state of the friction brake provides a measure of the deterioration of a deceleration effect of the friction brake during a deceleration of the vehicle by the friction brake.

According to another embodiment, provision is accordingly made for the switching criterion to indicate a minimum deceleration effect of a friction brake. If, according to this, it is ascertained during the determination of the state of the friction brake that a required minimum deceleration effect of the friction brake is no longer available, the self-cleaning operating mode is then activated in accordance with the switching pattern.

According to another embodiment, the accuracy with which the state of the friction brake is determined is improved by the fact that weather information in the region of the vehicle, in particular an ambient temperature and/or precipitation information, is taken into account in determining the state of the friction brake.

To determine such weather information, another embodiment envisages that the weather information is determined by at least one sensor, in particular a rain sensor and/or a temperature sensor and/or a brightness sensor (light sensor), of the vehicle.

According to another embodiment, it is furthermore envisaged that the weather information is determined from information sources outside the vehicle, in particular from the internet. In this way, it is possible, for example, to check the plausibility of weather data obtained from environment sensors of the vehicle.

In addition to taking into account weather information for determining the state of the friction brake, another embodiment envisages that the information describing the state of the friction brake is an energy input over a defined time period into at least one of the friction partners of the friction brake. By means of the energy input into the friction brake, it is possible to estimate with great reliability whether the friction brake has been sufficiently well cleaned by preceding braking operations and whether, as a result, activation of the self-cleaning operating mode according to the switching pattern can be suppressed.

During this process, the defined time period since the last activation of the self-cleaning operating mode is preferably determined.

According to another embodiment, another possibility for quantifying the state of the friction brake is used in that the information describing the state of the friction brake is a vehicle speed and/or a vehicle deceleration and/or a slope of the roadway in the region of the vehicle and/or a time period since the last activation of the self-cleaning operating mode.

In this case, the state of the friction brake is preferably determined individually for the individual friction brakes. Alternatively, it is also possible to make provision for the state of the friction brakes to be determined axle-wise.

According to a preferred embodiment, it is envisaged here that a check is made individually for each friction brake whether the self-cleaning operating mode is to be activated according to the switching pattern. Alternatively, the processing effort involved in the method can be reduced, according to another embodiment, by the fact that a check is made jointly for the friction brakes on a vehicle axle whether the self-cleaning operating mode is to be activated according to the switching pattern.

According to another embodiment, it is furthermore envisaged that if the self-cleaning operating mode is to be activated for a friction brake or for the friction brakes on an axle according to the switching pattern and the state of the friction brakes does not satisfy the switching criterion, the suppression of the activation of the self-cleaning operating mode takes place in a wheel-specific manner or axle-wise.

In a further aspect, the present application relates to a brake system for a motor vehicle, wherein the brake system has at least one friction brake and at least one regenerative brake. In this case, a defined switching pattern is specified for switching between a self-cleaning operating mode for cleaning the friction brake and a normal operating mode of the brake system. In this case, the brake system has a control unit which is designed to determine information describing the state of the at least one friction brake, to determine the state of the at least one friction brake from the information, to determine whether the state satisfies a specific switching criterion, and, if the self-cleaning operating mode is to be activated according to the switching pattern and the state of the friction brake does not satisfy the switching criterion, to suppress activation of the self-cleaning operating mode and maintain the normal operating mode.

BRIEF DESCRIPTION OF THE DRAWINGS

Preferred embodiments of the present application are explained in more detail below on the basis of the drawings. In the drawings.

DETAILED DESCRIPTION

In the text which follows, features that are similar or identical are denoted by the same reference signs.

Figure 1:
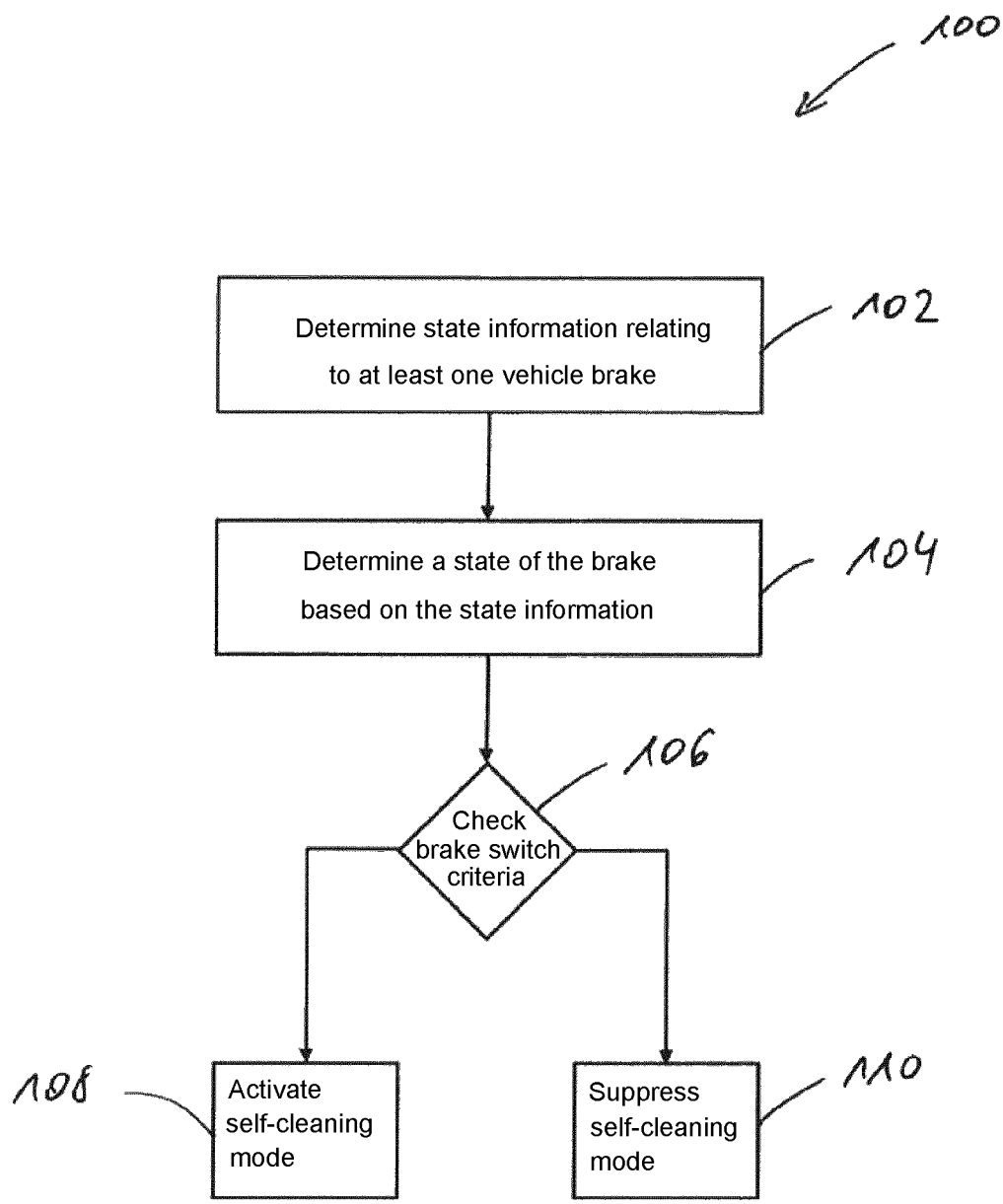
FIG. 1 shows a flow diagram of a method according to the example.

FIG. 1 shows a flow diagram of a method 100 according to the example for operating a vehicle brake system. Here, the vehicle brake system is used in a vehicle with four wheels, for example, wherein each wheel of the vehicle has a friction brake and a regenerative brake, for example. Alternatively, it is also possible to make provision for only some of the wheels to be equipped with friction brakes or regenerative brakes. The method described below remains substantially unaffected by this.

A friction brake is, for example, a disk brake in which friction pads arranged in a brake caliper are pressed on to the brake disk with a defined application force in the case of deceleration, with the result that a deceleration torque acts on the brake disk and hence on the corresponding vehicle wheel. Here, the application force can be made available either hydraulically or electromechanically.

The regenerative brake of a wheel can be implemented, for example, by connecting an electric-motor drive to the wheel, wherein the drive is designed to convert kinetic rotational energy of the wheel into electrical or thermal energy in a generator mode and, in the process, to exert a deceleration torque on the wheel.

Based on this infrastructure, an illustrative embodiment of the method according to the present application is explained below.

In this case, information which describes the state of at least one friction brake of the vehicle is initially determined in a first method step 102. This can be, for example, environmental data, such as an ambient temperature, information from a light or rain sensor, or weather data from external sources (internet). Furthermore, it is also possible to take account of information which relates to the previous actuations of the friction brake. It is possible here, for example, to include an elapsed time since the last actuation of the friction brake, an energy input into the friction brake during previous braking maneuvers, a brake pressure applied during previous braking maneuvers or a corresponding braking duration, a vehicle speed measured during braking, or a vehicle deceleration achieved by means of the braking maneuver.

Based on this information, the state of at least one friction brake of the vehicle is determined in a subsequent step 104. The state of the friction brake can, for example, indicate a remaining deceleration effect of the friction brake, assuming that in the meantime a certain quantity of contaminants or rust have accumulated on the surface of the brake disk.

Here, steps 102 and 104 can preferably be repeated continuously, ensuring that the state of the friction brake is known at all times.

After the state of the friction brake has been determined in step 104, a check is then made in step 106 to determine whether the state of the friction brake satisfies a defined switching criterion, which is specified by a corresponding switching pattern for switching between a self-cleaning operating mode for cleaning the friction brake and a normal operating mode of the brake system. The switching criterion can, for example, consist in that the self-cleaning operating mode is to be activated according to the switching pattern if the deceleration effect of the friction brake has fallen below a defined threshold.

Here, the check according to step 106 can be performed continuously or only as required, e.g. as soon as an activation of the self-cleaning operating mode is envisaged according to the switching pattern.

If, according to the switching pattern, an activation of the self-cleaning operating mode is, and it has been detected in step 106 that the state of the friction brake satisfies the switching criterion, the self-cleaning operating mode of the brake system is then activated in step 108 and taken into account in carrying out a subsequent braking demand. For example, it may be envisaged here that, in a subsequent implementation of a braking demand in the self-cleaning operating mode, only the friction brake is to be used to produce the deceleration torque demanded. As an alternative, provision may be made for a fixed proportion of the necessary deceleration torque to be produced by the friction brake. Thus, provision may be made, for example, for the braking force to be divided evenly between the friction brake and the regenerative brake in the self-cleaning operating mode.

If, on the other hand, it is established in step 106 that the state of the friction brake does not satisfy the switching criterion and that, furthermore, according to the switching pattern, an activation of the self-cleaning operating mode is provided, the envisaged activation of the self-cleaning operating mode is suppressed in step 110 until a subsequent activation provided in the switching pattern is pending. Instead, the friction brake and the regenerative brake continue to be operated in the normal operating mode and are controlled by a corresponding control unit in such a way that as high a proportion as possible of the kinetic energy that is released during a deceleration of the vehicle is converted into electrical energy and fed into the energy source of the vehicle.

In carrying out step 108, i.e. the activation of the self-cleaning operating mode for cleaning the friction brake, it is possible here for the self-cleaning operating mode to specify a number of criteria and/or parameters from which actuation of the friction brake due to a braking demand is sufficient for the brake to count as cleaned and consequently for it to be possible to switch back into the normal operating mode of the brake system. It is possible here, for example, to specify a minimum amount of energy to be produced and input into the brake disk that must be met for the friction brake to count as cleaned due to its use.

Figure 2:
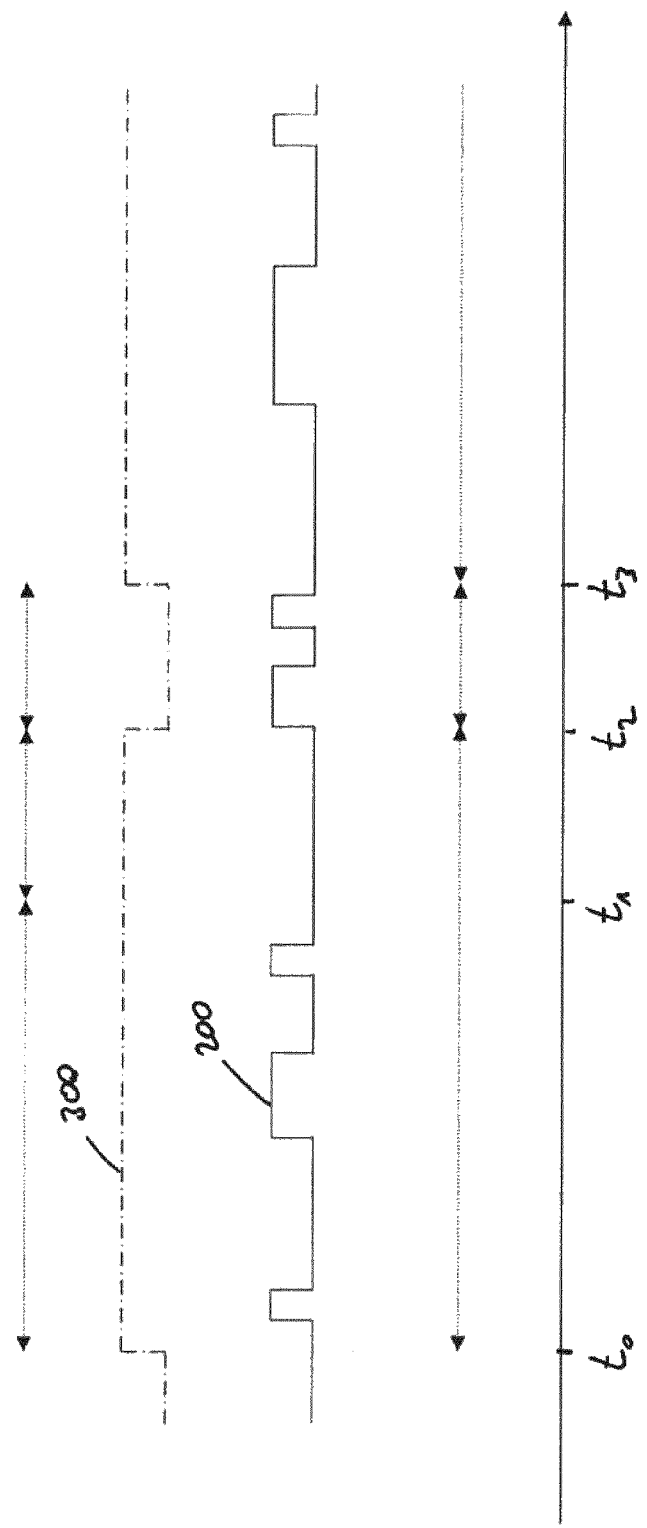
FIG. 2 shows a schematic illustration of the time characteristic of a switching pattern.

The time characteristic of a switchover between a self-cleaning operating mode and a normal operating mode with a corresponding switching pattern, together with corresponding braking demands, is described by way of example below with reference to FIG. 2. Here, a time scale is indicated on the horizontal axis of the diagram. The solid line 200 indicates whether there is a braking demand, while the chain-dotted line 300 indicates whether the brake system and consequently the friction brake is operating in the normal operating mode or whether the friction brake is operating in a self-cleaning operating mode.

Here, at a first time $t_0$, the brake system switches into the normal operating mode, with the result that incoming braking demands are preferably implemented by activation of the regenerative brake. In this case, the friction brake is normally used only for a small proportion of the deceleration of the vehicle, thus making it possible to achieve operation of the vehicle in a manner which is as energy-efficient as possible. Here, the state of the friction brake is monitored continuously by means of corresponding state information.

According to the switching pattern, a time window within which activation of the self-cleaning operating mode is provided according to the switching pattern begins at time $t_1$. Between time $t_1$ and $t_2$, however, there is no braking demand, and therefore the system remains in a standby state, and the operating state initially does not change.

Only at time $t_2$ is a braking demand received, triggering the method according to the present application. Since, according to the switching pattern, the self-cleaning operating mode is to be activated and the friction brake satisfies the switching criterion, the brake system switches into the self-cleaning operating mode. Consequently, the braking demand is then implemented according to the self-cleaning operating mode with defined parameters by the friction brake, and therefore self-cleaning of the friction brake takes place. Here, in the example illustrated, the first braking demand received after time $t_2$ is not sufficient for self-cleaning of the friction brake. The self-cleaning operating mode is therefore maintained at least until a further braking demand is received. In this case, the subsequent braking demand is sufficient in terms of its duration and the deceleration produced, and therefore it can be assumed that the friction brake has been sufficiently cleaned after its actuation to implement the braking demand. Consequently, the brake system switches back into the normal operating mode at time $t_3$.

In this case, it is possible, in particular, to envisage that, in the event of a braking demand, a predefined proportion of the vehicle deceleration specified by the braking demand or of the corresponding braking torque must be produced by the friction brake in the time between $t_2$ and $t_3$.

The invention claimed is:

1. A method of operating a vehicle brake system comprising at least one friction brake and at least one regenerative brake, the method comprising:
   determining information which describes at least one friction brake;
   determining a state of at least one friction brake based on the information;
   determining according to a switching pattern that the state satisfies a specific switching criterion for switching between a self-cleaning operating mode for cleaning the at least one friction brake and a normal operating mode of the vehicle brake system, wherein the switching pattern is based on at least one of a timer interval between successive activations of the self-cleaning operating mode, a maximum number of braking operations between successive activations of the friction brake, and environmental conditions in the region of the vehicle;
   switching to the self-cleaning operating mode for cleaning the at least one friction brake according to defined parameters when the state of the at least one friction brake does satisfy the switching criterion, wherein the switching criterion is a threshold of a deceleration effect of the at least one brake; and
   suppressing activation of the self-cleaning operating mode and maintaining the normal operating mode when the state of the at least one friction brake does not satisfy the switching criterion.

2. The method as claimed in claim 1, wherein the self-cleaning operating mode specifies a fixed relationship between a deceleration torque applied by the at least one friction brake and a deceleration torque applied by the at least one regenerative brake for decelerating the vehicle.

3. The method as claimed in claim 2, wherein only the at least one friction brake is used to decelerate the vehicle in the self-cleaning operating mode.

4. The method as claimed in claim 1, wherein determining the state of the friction brake comprises determining the state of the friction brake based on weather information in a region of the vehicle.

5. The method as claimed in claim 4, wherein the weather information is determined by at least one sensor of the vehicle.

6. The method as claimed in claim 4, wherein the weather information is determined from information sources outside the vehicle.

7. The method as claimed in claim 1, wherein the information describing the state of the at least one friction brake is an energy input over a defined time period into at least one of the friction partners of the friction brake.

8. The method as claimed in claim 7, wherein the defined time period comprises a time period since a last activation of the self-cleaning operating mode.

9. The method as claimed in claim 1, wherein the information describing the state of the at least one friction brake is a vehicle speed, a vehicle deceleration, a slope of a roadway in a region of the vehicle or a time period since a last activation of the self-cleaning operating mode.

10. The method as claimed in claim 1, wherein the state of the at least one friction brake is determined individually for the at least one friction brake or axle-wise.

11. The method as claimed in claim 1, wherein determining that the self-cleaning operating mode is to be activated according to the switching pattern comprises determining individually for each friction brake among the at least one friction brake or jointly for the at least one friction brake on a vehicle axle whether the self-cleaning operating mode is to be activated according to the switching pattern.

12. The method as claimed in claim 1, wherein the suppressing comprises suppression of the activation of the self-cleaning operating mode in a wheel-specific manner.

13. The method as claimed in claim 1, wherein the suppressing comprises suppression of the activation of the self-cleaning operating mode axle-wise.

14. The method as claimed in claim 1, further comprising:
   braking the at least one friction brake while in the self-cleaning operating mode;
   comparing the information which describes the at least one friction brake during the braking with the defined parameters of the self-cleaning operating mode; and
   determining self-cleaning of the at least one friction brake is achieved when the defined parameters of the self-cleaning mode are met;
   determining self-cleaning of the at least one friction brake is not achieved when the defined parameters of the self-cleaning mode are not met.

15. The method as claimed in claim 14, further comprising continuing in the self-cleaning operating mode until the defined parameters are met.

16. The method as claimed in claim 1, wherein the threshold deceleration effect is an actual deceleration value of the vehicle during a specific deceleration time period compared to a threshold deceleration value of the vehicle during the specific deceleration time period.

17. The method as claimed in claim 1, wherein the threshold deceleration effect is a measure of quantity of contaminants on the surface of the brake disk.

18. A method of operating a vehicle brake system comprising at least one friction brake and at least one regenerative brake, the method comprising:
   determining information which describes at least one friction brake;
   determining a state of at least one friction brake based on the information;
   determining according to a switching pattern, wherein the switching pattern is based on at least one of a timer interval between successive activations of the self-cleaning operating mode, a maximum number of braking operations between successive activations of the friction brake, and environmental conditions in the region of the vehicle;

determining the state of the at least one brake satisfies a specific switching criterion, wherein the switching criterion is a threshold of a deceleration effect of the at least one brake;

switching to a self-cleaning operating mode for cleaning the at least one friction brake according to defined parameters when the switching criterion is met; and suppressing activation of the self-cleaning operating mode and maintaining a normal operating mode when the switching criterion is not met.

19. The method as claimed in claim 18, wherein the threshold deceleration effect is an actual deceleration value of the vehicle during a specific deceleration time period compared to a threshold deceleration value of the vehicle during the specific deceleration time period.

20. The method as claimed in claim 18, further comprising:

comparing the information which describes the at least one friction brake during the braking with the defined parameters of the self-cleaning operating mode; and determining self-cleaning of the at least one friction brake is achieved when the defined parameters of the self-cleaning mode are met; and continuing in the self-cleaning operating mode until the defined parameters are met.

\* \* \* \* \*